March 6, 1928.
E. R. STOEKLE
APPARATUS FOR EFFECTING ENERGIZATION CONTROL OF AN ELECTRIC CIRCUIT
Filed Aug. 13, 1921
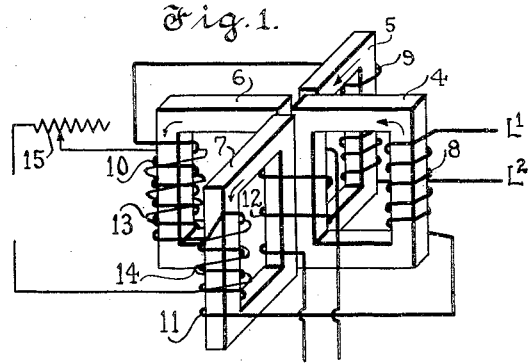
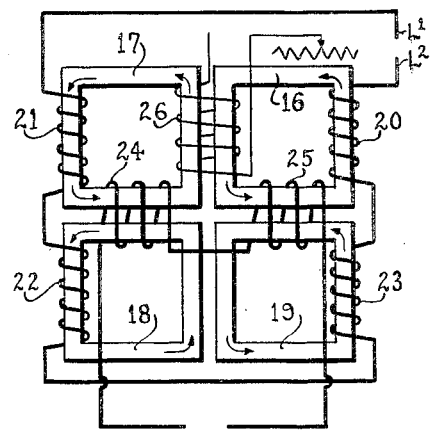
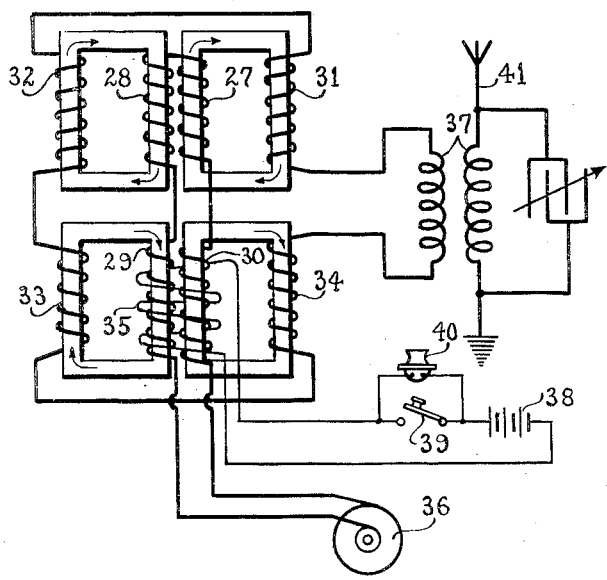
INVENTOR.
Erwin R. Stoekle
BY
ATTORNEY Patented Mar. 6, 1928.

1,661,740

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

APPARATUS FOR EFFECTING ENERGIZATION CONTROL OF AN ELECTRIC CIRCUIT.

Application filed August 13, 1921. Serial No. 492,198.

This invention relates to a method of and apparatus for effecting energization control of an electric circuit.

An object of the invention is that of providing a novel and improved method of control of an electrical condition of a circuit.

Another object is that of providing such a method whereby the range of variation of the controlled condition may be very materially extended.

Other objects and advantages will hereinafter appear.

According to the instant method it is proposed to effect energization control of an electric circuit through control of the mutual inductance of a plurality of coils by means of control of the permeability of their magnetic circuits. More specifically, in accordance with the present method electrical energy from a suitable source is utilized for production of component fluxes in mutually inductive relation to the circuit to be controlled and of such respective magnitude and relative direction with reference to such circuit as to tend to neutralize the collective inductive effect of such fluxes upon said circuit, all or certain of said fluxes being subjected to regulable influence, as by a current of relatively reduced frequency acting inductively upon the magnetic circuits thereof, such that the relative values of the several fluxes are caused to vary, whereby the joint inductive effect of the fluxes with reference to the controlled circuit differs from zero by an amount proportional to the value of such variation. Thus the fluxes are caused to effect energization of the controlled circuit, the value of such energization being variable with the value of the applied influence.

In the accompanying drawing wherein are illustrated certain types of apparatus adapted to performance of the instant method.

Figure 1 is a diagrammatic view of one form of such apparatus;

Fig. 2 is a similar view illustrating a modified form of the same; while,

Fig. 3 is also a similar view illustrating a further modified form of such apparatus together with a proposed particular adaptation thereof.

Referring to Fig. 1 of the drawing the same illustrates an alternating current transformer having four similar rectangular core structures 4, 5, 6 and 7 symmetrically arranged as illustrated each with a corresponding leg adjacent that of the others. Similar primary coils 8, 9, 10 and 11 are arranged upon the outer legs of the respective core structures, said coils being connected in series with one another to a suitable source $L'$ $L^2$ of alternating current. Said coils are so wound and proportioned with reference to one another that the same are adapted to induce in the respective core structures equal fluxes in the respective directions indicated by means of arrows.

A secondary coil 12 is arranged to surround all of the adjacently located legs of the several core structures and hence to be threaded by the several fluxes aforementioned, said secondary coil being connected to a translating device not shown.

The relative directions of the several fluxes aforedescribed are obviously such that their joint inductive effect with reference to the coil 12 is zero, assuming equality of said fluxes as aforedescribed, and hence in the absence of means such as that now to be described, no energization of the secondary circuit is effected. However, the outer legs of two core structures such as 6 and 7, wherein the fluxes are in like directions, are surrounded by additional coils 13 and 14 to be energized from a suitable source either of direct current or of alternating current of lower frequency than that of the source $L'$ $L^2$.

Such additional energization of the core structures 6 and 7 obviously serves to increase the degree of magnetic saturation of said cores with reference to the cores 4 and 5 whereby the permeability of the former with reference to the alternating current flux is less than the corresponding permeability of the latter. It thus follows that the alternating current fluxes in the cores 4 and 5 increase in magnitude over the corresponding fluxes in the cores 6 and 7 whereby the inductive effect of said former fluxes predominates with reference to the secondary coil 12, thus inducing in said secondary coil currents variable in magnitude with the value of the direct current excitation.

Obviously by varying the value of such excitation as by means of the rheostat 15 illustrated, the value of the current or voltage of the secondary circuit may be correspondingly and very accurately controlled.

Here it is to be observed that the direct current coils 13 and 14 are so wound with reference to one another and to the direction of flux in the cores surrounded thereby that said fluxes are adapted to produce no collective inductive effect with reference to the source of direct current. Further, said coils may advantageously comprise relatively large numbers of turns whereby a comparatively slight value of direct current is enabled to control relatively large values of alternating current energy.

Where the number of direct current turns upon the respective core structures is large, it may in some instances be found advantageous to separate the individual coils into insulated sections for purposes of reducing the total value of the insulation required.

The construction illustrated in Fig. 2 resembles that of Fig. 1, but is modified thereover in that the core structures 16, 17, 18 and 19 are arranged rectangularly in a common plane. The number and relation of the primary coils 20, 21, 22 and 23 is essentially that of Fig. 1, whereas, in this instance two secondary coils 24 and 25 are employed, said coils being connected in series and each surrounding adjacent legs of a pair of core structures, thereby constituting in effect an arrangement similar to that of Fig. 1 in this particular also. A single direct current coil 26 is employed the same being arranged to surround adjacent legs of the two upper core structures. Thus this particular arrangement serves to reduce the number of direct current coils required whereby an appreciable saving of material is effected, it being recalled that such coils require a relatively high number of turns. The operation of this construction does not differ from that of Fig. 1 in any fundamental or unobvious respect.

In the construction illustrated in Fig. 3, four primary coils 27, 28, 29 and 30 and four secondary coils 31, 32, 33 and 34 are employed, the former being associated with the respective adjacently located legs of the core structures and the latter being similarly associated with the corresponding non-adjacent legs of said core structures, the direction of winding of the individual coils being such as to maintain suitable relative directions of the several fluxes as aforedescribed. A single direct current coil 35 is arranged to surround the adjacent legs of one pair of core structures, the direction of fluxes traversing the respective cores being such that no alternating current E. M. F. is induced in said coil. The general operation of this form of device is likewise obvious from the foregoing.

However, in this instance associated devices are illustrated adapting the controller to service in a wireless telephone or telegraph system.

Thus the source of primary current is illustrated as comprising a high frequency alternating current generator 36, whereas the secondary circuit is arranged in conjunction with a conventional form of wave transmitting apparatus indicated generally at 37, while the control coil is arranged to be supplied with variable direct current as from a battery 38 through modifying apparatus such as the telegraph key 39 or the telephone transmitter 40.

In the operation of the controller for the particular purposes last described, it is apparent that so long as the direct current coil 35 remains unenergized no electrical energy is transformed or transmitted from the generator 36 to aerial 41 since the resultant of the fluxes induced in the several core structures is equal to zero. However, upon energization of the direct current coil by means of a potential subjected to variation by the action of the key or transmitter the permeability of the coils of the core structures subjected to influence thereby is varied with reference to that of the other core structures, whereby high frequency waves modulated in accordance with the character of the variations impressed upon such direct current energization are supplied to the aerial.

Reverting briefly to the general characteristics of the control herein contemplated, it is apparent that in ecah of the foregoing instances the primary and secondary coils may be transposed with reference to the various core structures, if desired, such transposition necessitating no variation in the relation of the direct circuit coil or coils thereto. Also it is apparent that in accordance with the instant method the input to the transformer secondary is caused to vary in the same sense as that in which the value of energization of the direct current or control circuit varies under control of its rheostat or other current varying means.

Since the energization of the control circuit may be either direct current or alternating current of lower frequency than that of the main supply circuit, such latter expression, and equivalent expressions as employed herein are to be construed as including current of zero frequency, that is to say, direct current.

What I claim as new and desire to secure by Letters Patent is:

1. A transformer comprising a magnetic structure having primary and secondary coils so associated therewith that the joint inductive effect of the former with reference to the latter is normally substantially zero, and separately excited means inductively related to said coils for imparting a material value to said effect.

2. Apparatus for effecting energization control of an electric circuit comprising, in combination, a transformer having primary and secondary coils so related and proportioned that the joint inductive effect of the former upon the latter is normally substantially zero, and reluctance varying means comprising a separate electric circuit for subjecting said transformer to regulable influence for imparting a material and regulable value to such effect.

3. Apparatus for effecting energization control of an electric circuit comprising, in combination, a transformer having primary and secondary coils so related and proportioned that the joint inductive effect of the former upon the latter is normally substantially zero, and separate means for subjecting said transformer to regulable inductive influence for regulably varying the value of such effect between zero and a given maximum value.

4. Apparatus for effecting energization control of an electric circuit comprising, in combination, a transformer having primary and secondary coils so related and proportioned that the joint inductive effect of the former upon the latter is normally substantially zero, and separate means for electrically effecting relative variation in magnetic permeability of different portions of said transformer to thereby impart a material and regulable value to such effect.

5. Apparatus for effecting energization control of an alternating current circuit comprising, in combination, an even number of separate endless magnetic core members of equal dimensions, primary and secondary windings inductively positioned with respect to each of said core members, said primary windings being arranged to produce magnetic fluxes of equal and opposite value in said core members to thereby neutralize the inductive effect upon said secondary windings, and direct current means for effecting varying degrees of saturation of certain of said core members to thereby effect proportional inductive energization of said secondary windings.

In witness whereof, I have hereunto subscribed my name.

ERWIN R. STOEKLE.